US012586389B2

(12) United States Patent
Singh et al.

(10) Patent No.: US 12,586,389 B2
(45) Date of Patent: Mar. 24, 2026

(54) TEXT IDENTIFICATION IN LAYERED DIGITAL CONTENT

(71) Applicant: Adobe Inc., San Jose, CA (US)

(72) Inventors: Punit Singh, New Delhi (IN); Shawn Alan Gaither, Raleigh, NC (US); Leonard Rosenthol, Margate City, NJ (US); Jayant Vaibhav Srivastava, Benares (IN); Ashutosh Mehra, Noida (IN)

(73) Assignee: Adobe Inc., San Jose, CA (US)

( * ) Notice: Subject to any disclaimer, the term of this patent is extended or adjusted under 35 U.S.C. 154(b) by 437 days.

(21) Appl. No.: 18/145,392

(22) Filed: Dec. 22, 2022

(65) Prior Publication Data

US 2024/0212367 A1     Jun. 27, 2024

(51) Int. Cl.
| | |
|---|---|
| *G06K 9/34* | (2006.01) |
| *G06V 10/26* | (2022.01) |
| *G06V 10/82* | (2022.01) |
| *G06V 20/62* | (2022.01) |
| *G06V 30/19* | (2022.01) |
| *G06V 30/413* | (2022.01) |

(52) U.S. Cl.
CPC .............. *G06V 20/62* (2022.01); *G06V 10/26* (2022.01); *G06V 10/82* (2022.01); *G06V 30/19173* (2022.01); *G06V 30/413* (2022.01)

(58) Field of Classification Search
None
See application file for complete search history.

(56) References Cited

U.S. PATENT DOCUMENTS

| | | | | |
|---|---|---|---|---|
| 5,280,367 A * | 1/1994 | Zuniga | ................. | G06V 30/413 |
| | | | | 358/464 |
| 5,900,953 A * | 5/1999 | Bottou | .................... | G06T 7/194 |
| | | | | 358/464 |
| 6,470,094 B1 * | 10/2002 | Lienhart | ................... | G06T 7/11 |
| | | | | 382/176 |
| 6,473,522 B1 * | 10/2002 | Lienhart | ................... | G06T 7/11 |
| | | | | 382/164 |
| 6,735,740 B2 * | 5/2004 | Sakai | ........................ | G06T 3/40 |
| | | | | 382/176 |

(Continued)

FOREIGN PATENT DOCUMENTS

| | | | | | |
|---|---|---|---|---|---|
| CN | 104981356 B | * | 4/2017 | ........... | G02B 3/0056 |
| CN | 106791022 A | * | 5/2017 | ............. | G06T 11/40 |

(Continued)

OTHER PUBLICATIONS

CN-106791022-A (machine translation) (Year: 2017).*

(Continued)

*Primary Examiner* — Feng Niu
(74) *Attorney, Agent, or Firm* — FIG. 1 Patents

(57) ABSTRACT

Techniques for text identification in layered digital content are described. In an implementation, an item of digital content is received including a plurality of layers. A text layer is identified in the item of digital content from the plurality of layers. A text channel image is generated by isolating the text layer from the plurality of layers. A text identification is then generated based on the text channel image using a page decomposition model, the page decomposition model trained using machine learning.

20 Claims, 11 Drawing Sheets

(56)  References Cited

U.S. PATENT DOCUMENTS

| | | | | | |
|---|---|---|---|---|---|
| 7,133,565 | B2* | 11/2006 | Toda | G06T 9/00 | |
| | | | | | 382/176 |
| 7,545,992 | B2* | 6/2009 | Kato | H04N 1/00212 | |
| | | | | | 382/253 |
| 7,623,711 | B2* | 11/2009 | Berkner | G06V 30/414 | |
| | | | | | 382/176 |
| 7,782,491 | B2* | 8/2010 | Ishizuka | H04N 1/56 | |
| | | | | | 382/163 |
| 8,526,061 | B2* | 9/2013 | Shirata | H04N 1/40012 | |
| | | | | | 345/592 |
| 8,763,038 | B2* | 6/2014 | Candelore | H04N 21/84 | |
| | | | | | 725/39 |
| 9,094,556 | B2* | 7/2015 | Ohk | H04N 1/00803 | |
| 10,579,892 | B1* | 3/2020 | Wilbert | G06Q 40/03 | |
| 11,087,168 | B2* | 8/2021 | Xiong | G06V 20/62 | |
| 11,354,890 | B2* | 6/2022 | Uejo | G06V 30/416 | |
| 11,494,678 | B2* | 11/2022 | Chen | G06N 5/045 | |
| 11,651,147 | B2* | 5/2023 | Heyns | G06N 20/00 | |
| | | | | | 715/708 |
| 11,734,859 | B2* | 8/2023 | Yumbe | H04N 23/632 | |
| | | | | | 348/239 |
| 2002/0159636 | A1* | 10/2002 | Lienhart | G06T 7/194 | |
| | | | | | 382/176 |
| 2006/0008113 | A1* | 1/2006 | Matsukubo | G06V 30/413 | |
| | | | | | 358/1.14 |
| 2006/0008114 | A1* | 1/2006 | Sekiguchi | H04N 1/00331 | |
| | | | | | 358/1.14 |
| 2008/0034292 | A1* | 2/2008 | Brunner | G06T 1/20 | |
| | | | | | 715/764 |
| 2010/0192178 | A1* | 7/2010 | Candelore | H04N 21/4312 | |
| | | | | | 382/229 |
| 2011/0069885 | A1* | 3/2011 | Malik | G06T 11/60 | |
| | | | | | 382/176 |
| 2012/0093354 | A1* | 4/2012 | Kletter | G06V 30/413 | |
| | | | | | 382/100 |
| 2012/0185768 | A1* | 7/2012 | Dowd | G06F 3/0482 | |
| | | | | | 715/764 |
| 2015/0062666 | A1* | 3/2015 | Ohk | H04N 1/00803 | |
| | | | | | 358/474 |
| 2015/0063698 | A1* | 3/2015 | Adini | G06V 30/153 | |
| | | | | | 382/176 |
| 2015/0093029 | A1* | 4/2015 | Tijssen | G06T 11/00 | |
| | | | | | 382/173 |
| 2015/0346954 | A1* | 12/2015 | Parag | G06F 3/04842 | |
| | | | | | 715/763 |
| 2015/0378973 | A1* | 12/2015 | Korneev | G06F 40/103 | |
| | | | | | 715/256 |
| 2016/0110999 | A1* | 4/2016 | Bulan | G06V 20/62 | |
| | | | | | 348/149 |
| 2018/0322339 | A1* | 11/2018 | Cohen | G06V 10/82 | |
| 2020/0117943 | A1* | 4/2020 | Xiong | G06T 7/00 | |
| 2020/0293930 | A1* | 9/2020 | Chen | G06N 5/04 | |
| 2020/0402304 | A1* | 12/2020 | Hwang | G06T 7/168 | |
| 2021/0082155 | A1* | 3/2021 | Yumbe | H04N 23/80 | |
| 2021/0110586 | A1* | 4/2021 | Gopalakrishnan | G06T 11/60 | |
| 2021/0166395 | A1* | 6/2021 | Chen | G06T 7/11 | |
| 2021/0248402 | A1* | 8/2021 | Uejo | G06V 30/274 | |
| 2021/0350485 | A1* | 11/2021 | Majumdar | G06N 20/00 | |
| 2022/0121821 | A1* | 4/2022 | Yaramada | G06V 30/19007 | |
| 2022/0237932 | A1* | 7/2022 | Lu | G06T 7/155 | |
| 2022/0237937 | A1* | 7/2022 | Parida | G06F 16/5846 | |
| 2022/0414317 | A1* | 12/2022 | Heyns | G06F 40/289 | |
| 2023/0119741 | A1* | 4/2023 | Ding | G06T 11/60 | |
| | | | | | 382/103 |
| 2023/0237251 | A1* | 7/2023 | Brdiczka | G06F 40/12 | |
| | | | | | 715/256 |
| 2023/0326225 | A1* | 10/2023 | Hron, II | G06V 30/1456 | |
| 2023/0401814 | A1* | 12/2023 | Kockx | G01F 23/02 | |
| 2024/0064262 | A1* | 2/2024 | Sakai | H04N 1/6058 | |

FOREIGN PATENT DOCUMENTS

| | | | | | | |
|---|---|---|---|---|---|---|
| CN | | 110365649 | A | * | 10/2019 | H04L 63/02 |
| CN | | 114926840 | A | * | 8/2022 | G06V 30/1463 |
| CN | | 115396690 | A | * | 11/2022 | H04N 21/235 |
| JP | | 4168262 | B2 | * | 10/2008 | |
| JP | | 2008293462 | A | * | 12/2008 | G06F 40/151 |
| JP | | 4356262 | B2 | * | 11/2009 | |
| JP | | 2016224847 | A | * | 12/2016 | |
| JP | | 2022161564 | A | * | 10/2022 | G06V 30/18 |

OTHER PUBLICATIONS

JP-4168262-B2 (machine translation) (Year: 2008).*
CN-115396690-A (machine translation) (Year: 2022).*
CN-104981356-B (machine translation) (Year: 2017).*
JP-2008293462-A (machine translation) (Year: 2008).*
JP-2016224847-A (machine translation) (Year: 2016).*
JP-2022161564-A (machine translation) (Year: 2022).*
CN-110365649-A (machine translation) (Year: 2019).*
CN-114926840-A (machine translation) (Year: 2022).*
JP-4356262-B2 (machine translation) (Year: 2019).*

* cited by examiner

200

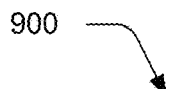

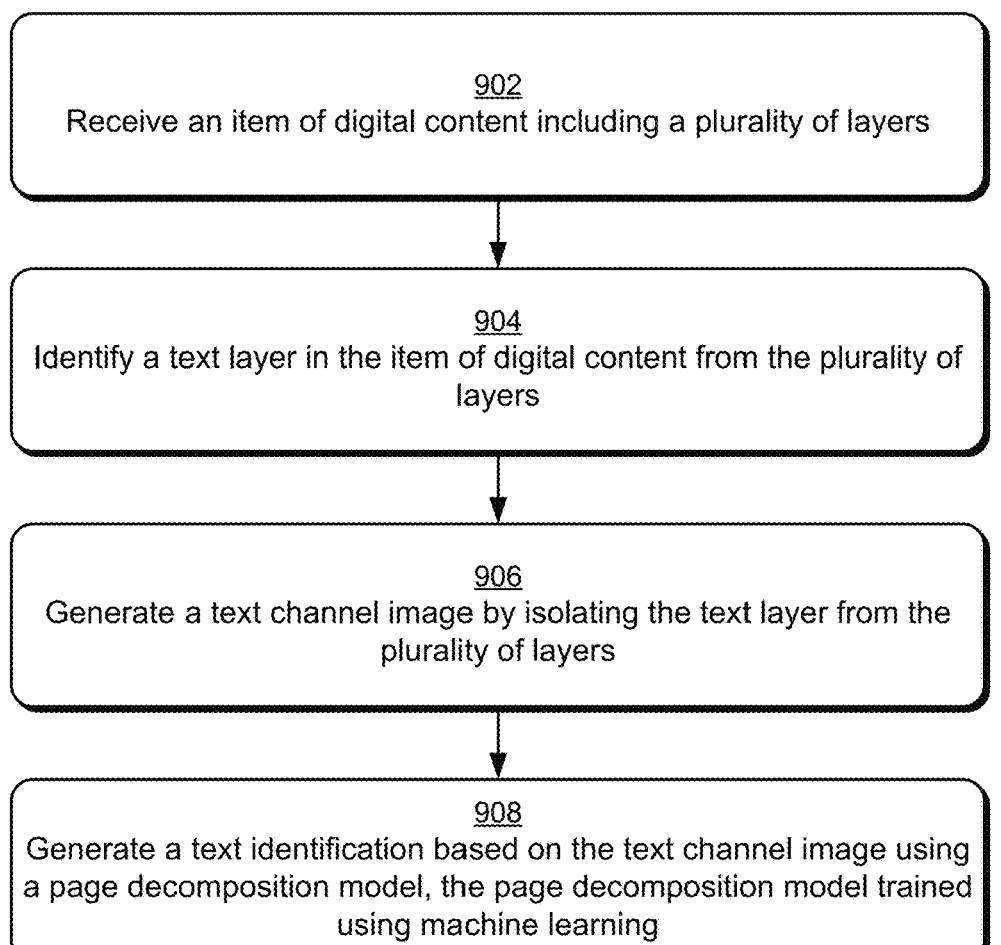

902
Receive an item of digital content including a plurality of layers

904
Identify a text layer in the item of digital content from the plurality of layers 906
Generate a text channel image by isolating the text layer from the plurality of layers 908
Generate a text identification based on the text channel image using a page decomposition model, the page decomposition model trained using machine learning

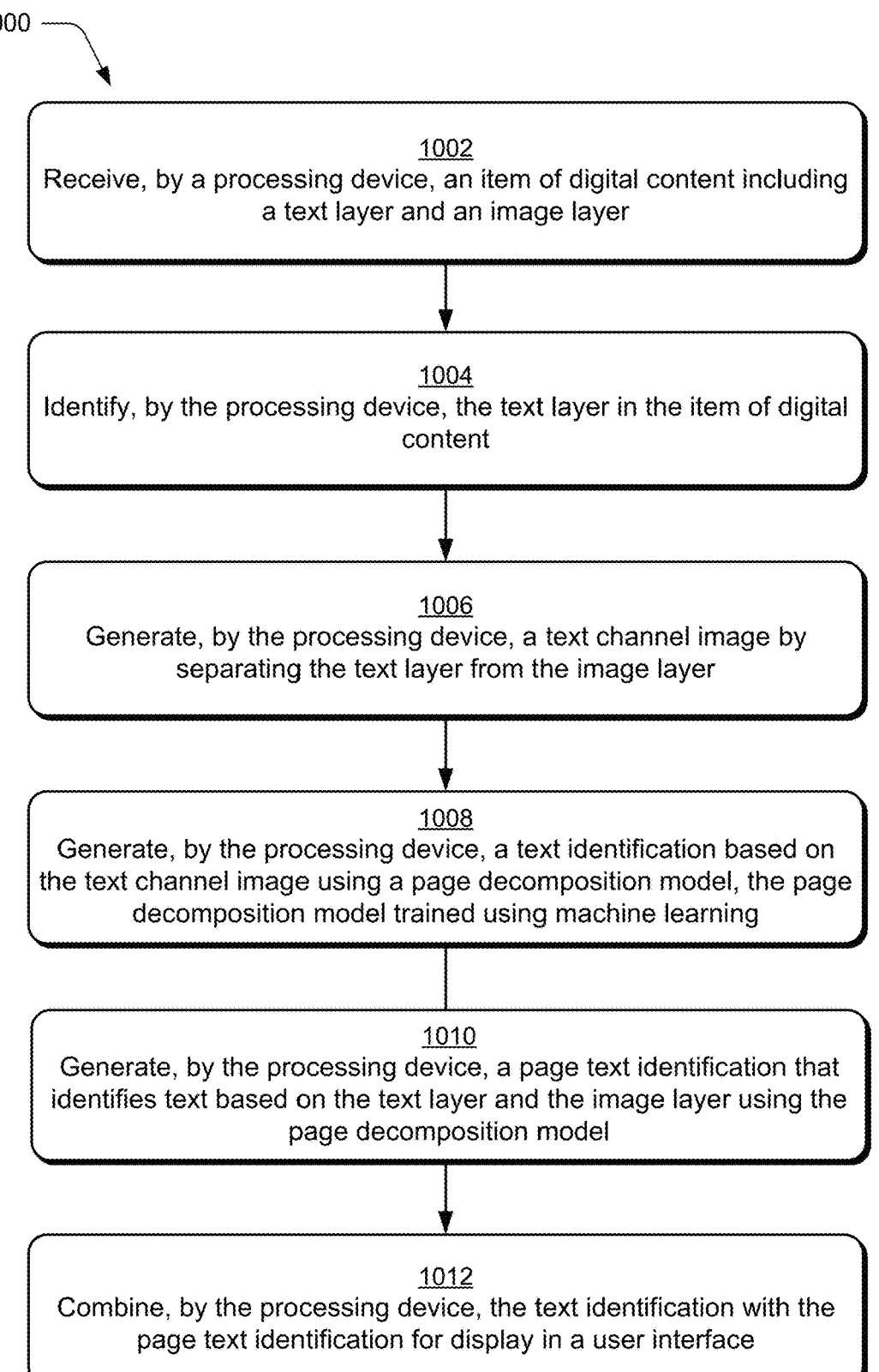

<u>1002</u>
Receive, by a processing device, an item of digital content including a text layer and an image layer <u>1004</u>
Identify, by the processing device, the text layer in the item of digital content <u>1006</u>
Generate, by the processing device, a text channel image by separating the text layer from the image layer <u>1008</u>
Generate, by the processing device, a text identification based on the text channel image using a page decomposition model, the page decomposition model trained using machine learning <u>1010</u>
Generate, by the processing device, a page text identification that identifies text based on the text layer and the image layer using the page decomposition model <u>1012</u>
Combine, by the processing device, the text identification with the page text identification for display in a user interface

TEXT IDENTIFICATION IN LAYERED DIGITAL CONTENT

BACKGROUND

Text identification applications enable text recognition in layered digital image content, such as a portable document format (PDF). Examples of PDFs include slideshow slides, literature, instructions, signs, and posters. Text recognition supports a variety of tasks, including PDF editing. For instance, text is identified prior to changing text content or appearance in a PDF. Text recognition is also used to support other applications, including translation, text-to-speech, internet browsing, image processing, and information storage.

SUMMARY

Techniques for text identification in layered content are described. In an example, a page decomposition module receives an item of digital content including a plurality of layers, such as a PDF. The plurality of layers includes a text layer and at least one other layer, e.g., an image layer, a vector layer, and so forth. An identification module identifies a text layer in the item of digital content from the plurality of layers. A generation module generates a text channel image by isolating the text layer form the plurality of layers. A text identification module generates a text identification based on the text channel image using a page decomposition model. The page decomposition model is trained using machine learning to decompose the text channel image into regions of text. Using a text channel image as input increases text identification accuracy by eliminating visual background noise that would otherwise interfere with text identification in layered digital content. A page text identification module generates a page text identification based on the plurality of layers using a page decomposition model. A combination module then combines the text identification with the page text identification for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 9 depicts a procedure in an example implementation of text identification in layered digital content.

FIG. 10 depicts a procedure in an additional example implementation of text identification in layered digital content.

DETAILED DESCRIPTION

Overview

Figure 1:
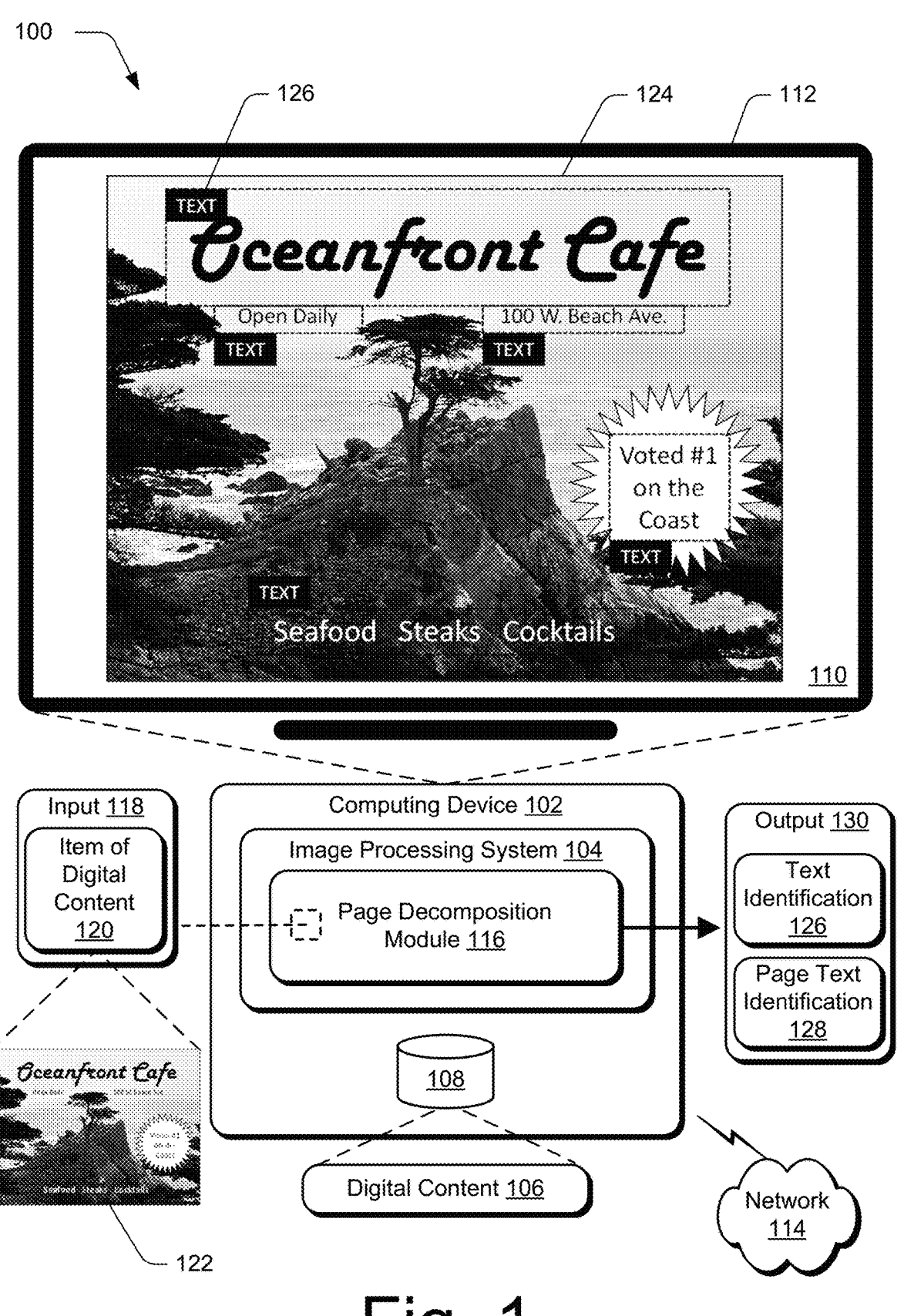
FIG. 1 is an illustration of a digital medium environment in an example implementation that is operable to employ the text identification in layered digital content techniques described herein.

Text identification is used to recognize text in layered digital image content, such as a portable document format (PDF), slide in a presentation, and so forth. This supports a variety of tasks, including PDF editing. For instance, text is identified prior to changing text content or appearance in a PDF. Text identification is also used to support other applications, including, but not limited to, translation, text-to-speech, internet browsing, image processing, and information storage.

Conventional text identification applications apply a page segmentation model to recognize areas of text. However, conventional text identification applications use an entirety of a layered digital image (including overlapping text and image layers) as input to the page segmentation model. As such, these conventional applications struggle to identify text layered over objects in a busy background with a significant number of objects in the image layer. For instance, a conventional text identification application often misses text that appears layered over a car in a photograph because the shape of the text appears as a feature of the car. Accordingly, conventional techniques are an inaccurate identifier of text in a layered digital image.

Conventional techniques used to address these challenges in inaccurate text identification in a layered digital image include performing data annotation with a large amount of data from the layered image. This involves manually adding categories, labels, and other contextual elements to a data set. However, this process is inefficient, as it involves a significant amount of files and model re-training.

Accordingly, techniques for text identification in layered digital content are described that overcome these conventional challenges. Rather than inputting an entire layered digital image into a page segmentation model, a text channel layer is generated by separating the text layer from the other layers for input into a page decomposition model. This simplifies the model input by removing images and presenting text on a white background. As a result, the page decomposition model is configured to accurately identifying text that is layered over an otherwise noisy image.

In an example, a computing device implements a page decomposition module that receives a layered PDF, e.g., as displayed in a user interface. The layered PDF includes a plurality of layers, examples of which include a text layer, an image layer, and a vector layer. The text layer overlaps at least the image layer or the vector layer in this example.

The page decomposition module identifies the text layer from the plurality of layers based on characteristics of the text layer or a label corresponding to the text layer indicating a text layer. Based on the text layer, the page decomposition module generates a text channel image by isolating the text layer from the plurality of layers. The text channel image includes, solely, the text layer from the plurality of layers. The text layer includes text elements, which are displayed in the text channel image on a white background. The text channel image also maintains a text layout of the text layer in the original PDF.

In some examples, text elements in the text layer are displayed as non-black text. For example, a PDF includes a background image layer with dark portions and light portions. The text overlapping the dark portions of the image layer is white or another light color. The text overlapping the light portions of the image layer is black text. In order for the text elements in the text layer to display clearly on a white background when the text channel image is generated, non-black text is changed to black text. This results in black text sharply displayed on a white background.

The page decomposition module then generates a text identification based on the text channel image using a page decomposition model, which is trained using machine learning. The text identification includes a bounding box surrounding an instance of text and a label associating the instance of text with a text class for each instance of text in the text channel image. To generate the text identification, the page decomposition model receives the text channel image and decomposes it into a plurality of classes, examples of which include text, heading, list, table, figure, and footnote. Each of these classes is a text identification of what type or class of text is present in the text channel image. In this way, the page decomposition model generates a text identification by dividing the text channel image into regions and identifying text in the regions.

In another example, the page decomposition module combines the text identification with a page text identification for display in a user interface. The page text identification is generated based on the plurality of layers and identifies classes of text in all layers of the plurality of layers. Once combined, redundant text identifications from the text identification and the page text identification are removed.

Text identification in layered digital content overcomes the disadvantages of conventional text identification techniques. For example, inputting a text channel image that contains black text, solely, on a white background into the page decomposition model reduces the likelihood that the page decomposition model misses text overlapping a busy background image. This allows the page decomposition model to readily identify black text on a white background, increasing model accuracy. Text identification in layered digital content also reduces use of data annotation as performed in conventional techniques that involve a large amount of data from the layered image. This reduces overhead associated with collecting new data and formulating annotation guidelines.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the text identification in layered digital content techniques described herein. The illustrated digital medium environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources, e.g., mobile devices. Additionally, although a single computing device 102 is shown, the computing device 102 is also representative of a plurality of different devices, such as multiple servers utilized by a business to perform operations "over the cloud" as described in FIG. 10.

The computing device 102 is illustrated as including an image processing system 104. The image processing system 104 is implemented at least partially in hardware of the computing device 102 to process and represent digital content 106, which is illustrated as maintained in storage 108 of the computing device 102. Such processing includes creation of the digital content 106, representation of the digital content 106, modification of the digital content 106, and rendering of the digital content 106 for display in a user interface 110 for output, e.g., by a display device 112. Although illustrated as implemented locally at the computing device 102, functionality of the image processing system 104 is also configurable as whole or part via functionality available via the network 114, such as part of a web service or "in the cloud."

An example of functionality incorporated by the image processing system 104 to process the digital content 106 is illustrated as a page decomposition module 116. The page decomposition module 116 is configured in the illustrated example to identify text in layered digital content.

The page decomposition module 116 receives an input 118 including an item of digital content 120. Here, the item of digital content 120 is a PDF of a digital image featuring an advertisement. The item of digital content 120 includes a plurality of layers 122, including a text layer, an image layer, and a vector layer. In this example, the text layer features the text "Oceanfront Cafe," "Open Daily," "100 W. Beach Ave.," "Voted #1 on the Coast," and "Seafood Steaks Cocktails." The image layer features an image of an ocean coastline. The vector layer features an outline of a star shape. The text layer and the vector layer overlap the image layer.

The page decomposition module 116 identifies the text layer in the item of digital content 120 and generates a text channel image 124 by isolating the text layer from the plurality of layers 122. The text channel image 124 presents the text from the text layer on a white background. Neither images from the image layer nor vectors from the vector layer are included in the text channel image 124.

The page decomposition module 116 then generates a text identification 126 based on the text channel image 124 using a page decomposition model trained using machine learning. The text identification 126 is the text channel image 124 with the addition of a bounding box identifying text and a label identifying what type or class of text is present in the text channel image 124. The text identification 126 identifies text elements in the text channel image 124. In some examples, the text identification 126 also includes an identification of a type of text element identified.

In this example, the page decomposition module 116 also generates a page text identification 128 based on the plurality of layers 122. The page text identification 128 identifies instances of text in the entire item of digital content 120, including instances of text in the text layer, the image layer, and the vector layer.

The text identification 126 is then combined with the page text identification 128 by overlapping the text identification 126 with the page text identification 128 into an output 130 for display in the user interface 110. Once combined, redundant text identifications from the text identification 126 and the page text identification 128 are removed.

Conventional text identification applications input an entire PDF (including overlapping text and image layers) into a page decomposition model. However, conventional applications struggle to identify text layered over objects in a busy background. This is because text elements in the text layer are frequently missed in conventional scenarios when layered on top of an image element. Consider a situation in which text appears over a car in a PDF. A conventional text identification application often misses text that appears over a car in a photograph because it appears as part of the car. Conventional solutions to this challenge involve use of data annotation with a significant amount of data from the layered image.

Text identification in layered digital content overcomes conventional limitations to accurately identify text. This is performed by separating a text layer from other layers of the layered digital content. The text layer is used to generate a text channel image, which presents the text on a blank white background. This is used by a page decomposition model to generate a text identification and reduces the chance that the page decomposition model will miss text by eliminating the background image layer. Later, the text identification is combined with the page text identification based on the plurality of layers. In some examples, the text channel image is generated by altering the text layer to change non-black text to black text to facilitate efficient text identification if the original text color is white, allowing the page decomposition model to easily identify black text on a white background. Further discussion of these and other examples are included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Text Identification in Layered Digital Content

Figure 2:
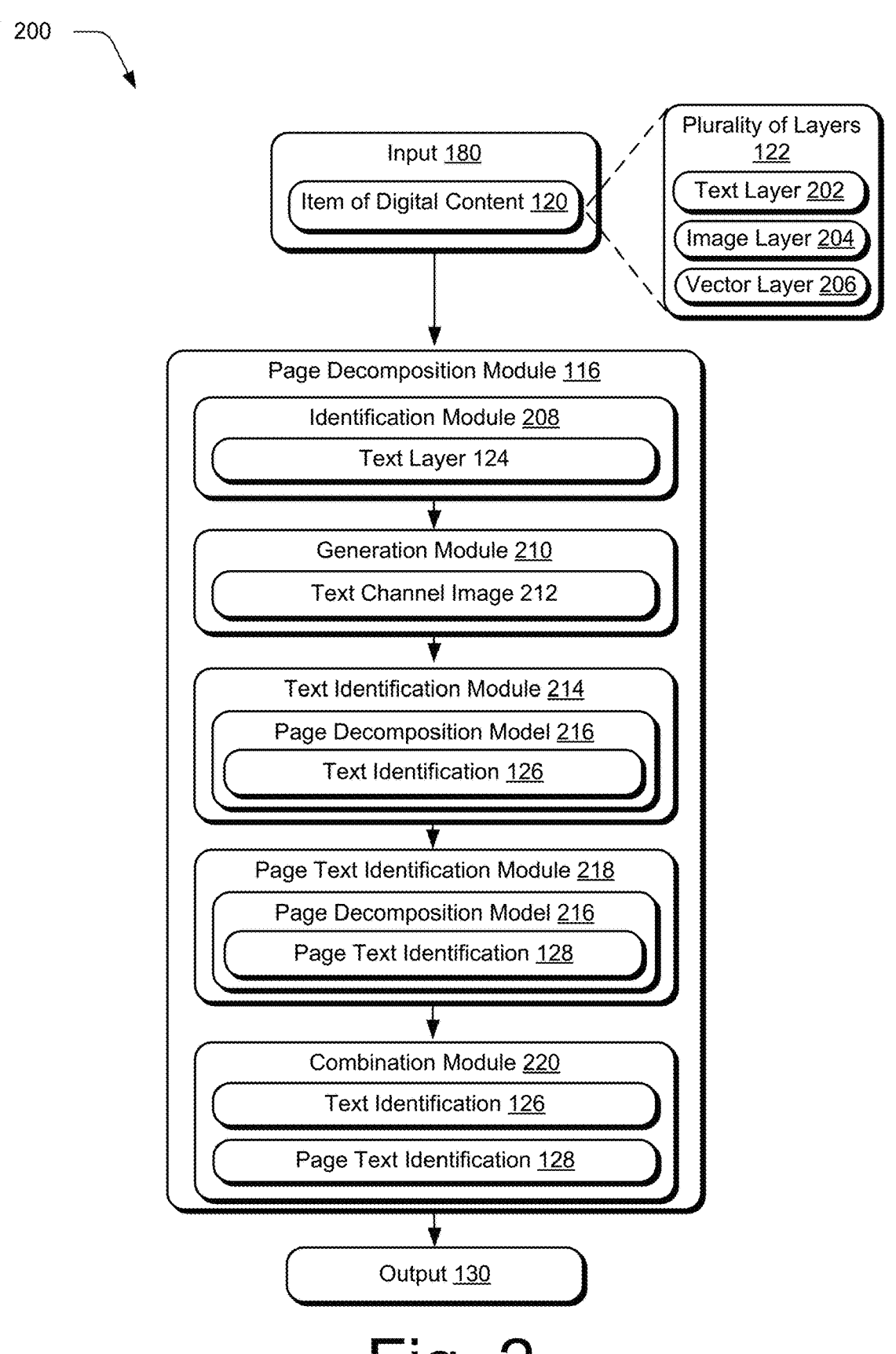
FIG. 2 depicts a system in an example implementation showing operation of the page decomposition module of FIG. 1 in greater detail.

FIG. 2 depicts a system 200 in an example implementation showing operation of the page decomposition module

116 of FIG. 1 in greater detail. The following discussion describes techniques that are implementable utilizing the previously described systems and devices. Aspects of each of the procedures are implemented in hardware, firmware, software, or a combination thereof. The procedures are shown as a set of blocks that specify operations performed and/or caused by one or more devices and are not necessarily limited to the orders shown for performing the operations by the respective blocks. In portions of the following discussion, reference is made to FIGS. 1-10.

To begin in this example, the page decomposition module 116 receives an input 118 including an item of digital content 120, which includes a plurality of layers 122. The plurality of layers 122 include a text layer 202, an image layer 204, and a vector layer 206. In some examples, the layers are referred to as channels.

The page decomposition module 116 includes an identification module 208. The identification module 208 identifies the text layer 202 in the plurality of layers 122.

The page decomposition module 116 also includes a generation module 210. The generation module 210 generates a text channel image 212 by isolating the text layer 202 from the plurality of layers 122. The text channel image 212 presents the text from the text layer 202 overlapping a white background. Neither images from the image layer 204 nor vectors from the vector layer 206 are included in the text channel image 212.

The page decomposition module 116 also includes a text identification module 214. The text identification module 214 generates a text identification 126 based on the text channel image 212 using a page decomposition model 216. The page decomposition model 216 is trained using machine learning and is discussed below with respect to FIG. 6. The text identification 126 includes a bounding box identifying text in the text channel image 212 and a label identifying what type or class of text is present in the text channel image 212.

In some examples, the page decomposition module 116 also includes a page text identification module 218. The page text identification module 218 generates a page text identification 128 based on the plurality of layers 122. The page text identification 128 identifies instances of text in the plurality of layers 122 of the entire item of digital content 120, including instances of text in the text layer 202, the image layer 204, and the vector layer 206.

In some examples, the page decomposition module 116 also includes a combination module 220. The combination module 220 combines the text identification 126 with the page text identification 128 for display in a user interface 110 as an output 130.

FIGS. 3-8 depict stages of text identification in layered digital content. In some examples, the stages depicted in these figures are performed in a different order than described below.

Figure 3:
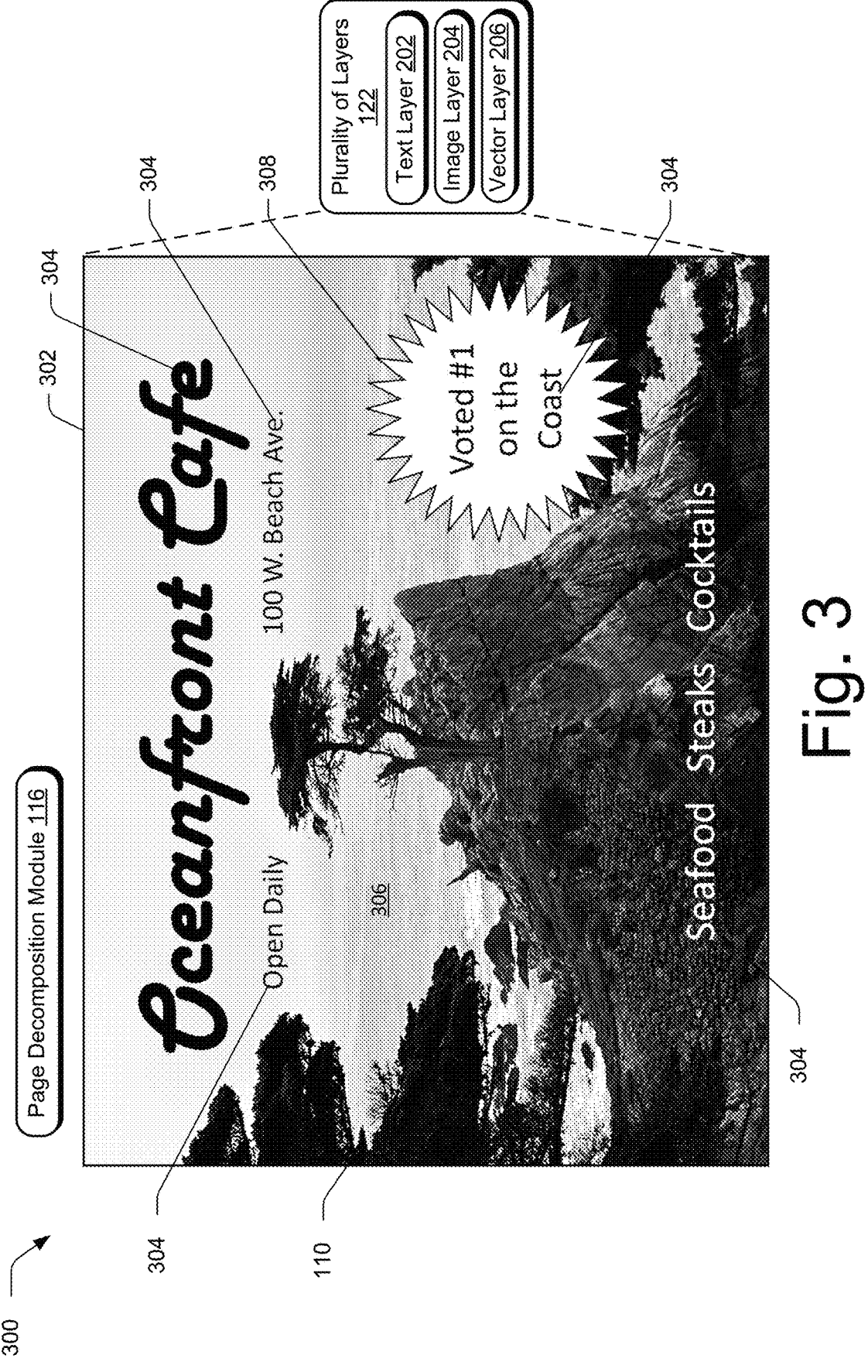
FIG. 3 depicts an example of receiving an item of digital content including a plurality of layers.

FIG. 3 depicts an example 300 of receiving an item of digital content 120 including a plurality of layers 122. As illustrated, the page decomposition module 116 receives an item of digital content 120, which is a layered PDF 302 displayed in a user interface 110. In this example, the layered PDF 302 is an advertisement for a restaurant. Other examples of PDFs include, but are not limited to, slideshow slides, literature, instructions, signs, and posters. The layered PDF 302 includes a text layer 202, an image layer 204, and a vector layer 206. In this example, the text layer 202 features text elements 304 including "Oceanfront Cafe," "Open Daily," "100 W. Beach Ave.," "Voted #1 on the Coast," and "Seafood Steaks Cocktails." The image layer 204 features an image element 306 of an ocean coastline. The vector layer 206 features a vector element 308 of an outline of a star shape. The text layer 202 and the vector layer 206 overlap the image layer 204. In this example, the image layer 204 is visible behind the text layer 202 and the vector layer 206 because the text elements 304 and vector element 308 cover a small portion of the image layer 204 in the background.

Figure 4:
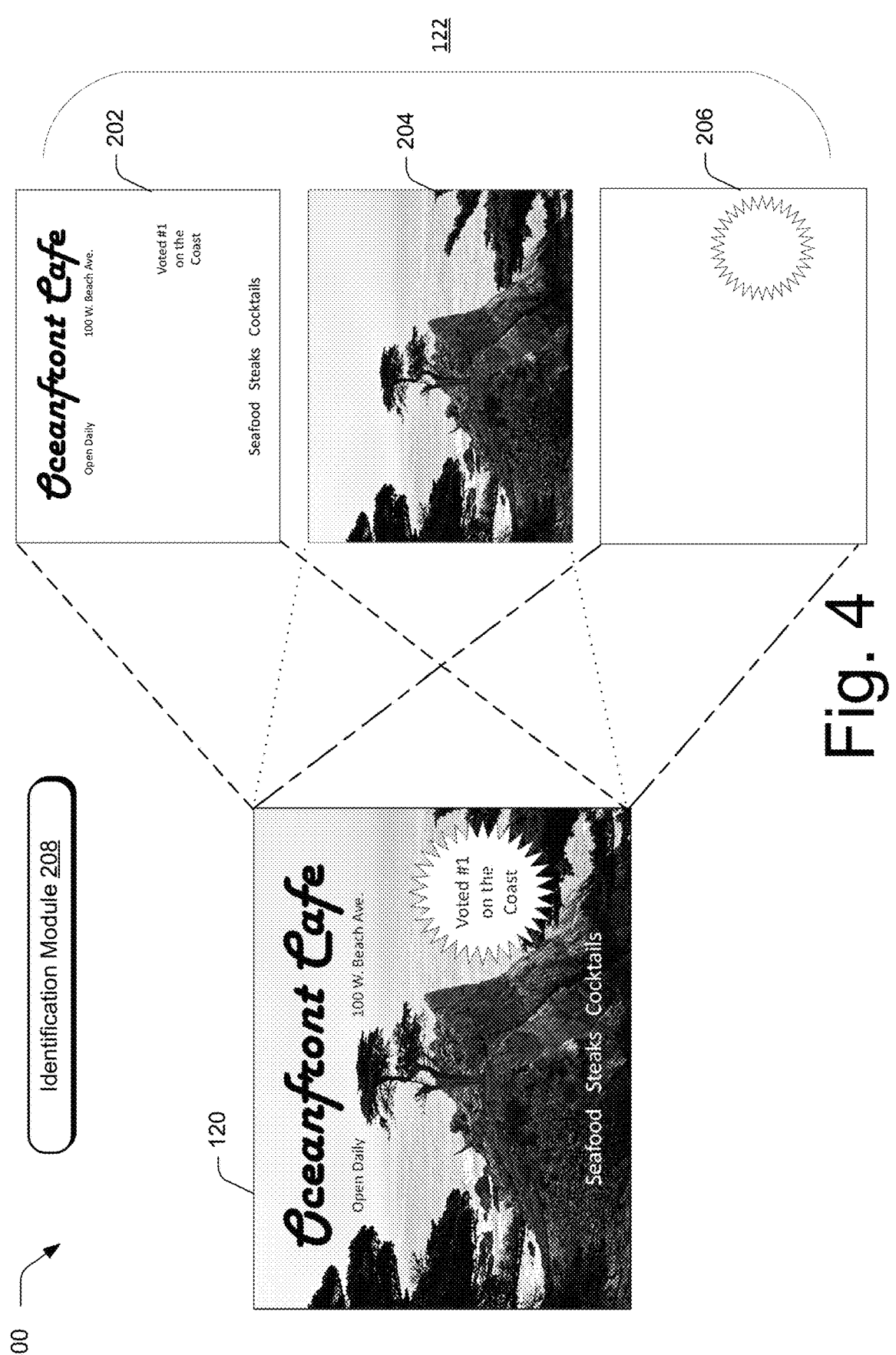
FIG. 4 depicts an example of identifying a text layer in the item of digital content from the plurality of layers.

FIG. 4 depicts an example 400 of identifying a text layer 202 in the item of digital content 120 from the plurality of layers 122. FIG. 4 is a continuation of the example described in FIG. 3. As discussed earlier with respect to FIG. 3, the page decomposition module 116 receives an item of digital content 120 including a plurality of layers 122. The plurality of layers 122 include, but are not limited to, a text layer 202, an image layer 204, and a vector layer 206. The plurality of layers 122 overlap each other in the item of digital content 120. In this example, the text layer and the vector layer overlap the image layer.

Returning to FIG. 4, the identification module 208 identifies a text layer 202 from the plurality of layers 122. The identification module 208 recognizes the text layer 202 based on characteristics of the text layer 202 or a label corresponding to the text layer 202 indicating a text layer 202. Characteristics of the text layer 202 include data type, file type, or the presence of text.

In some examples, the identification module 208 receives each of the plurality of layers 122 as separate data and identifies the text layer 202 before hiding the other layers of the plurality of layers 122 that are not the text layer 202. In other examples, the identification module 208 separates each of the plurality of layers 122 before identifying the text layer 202.

Figure 5:
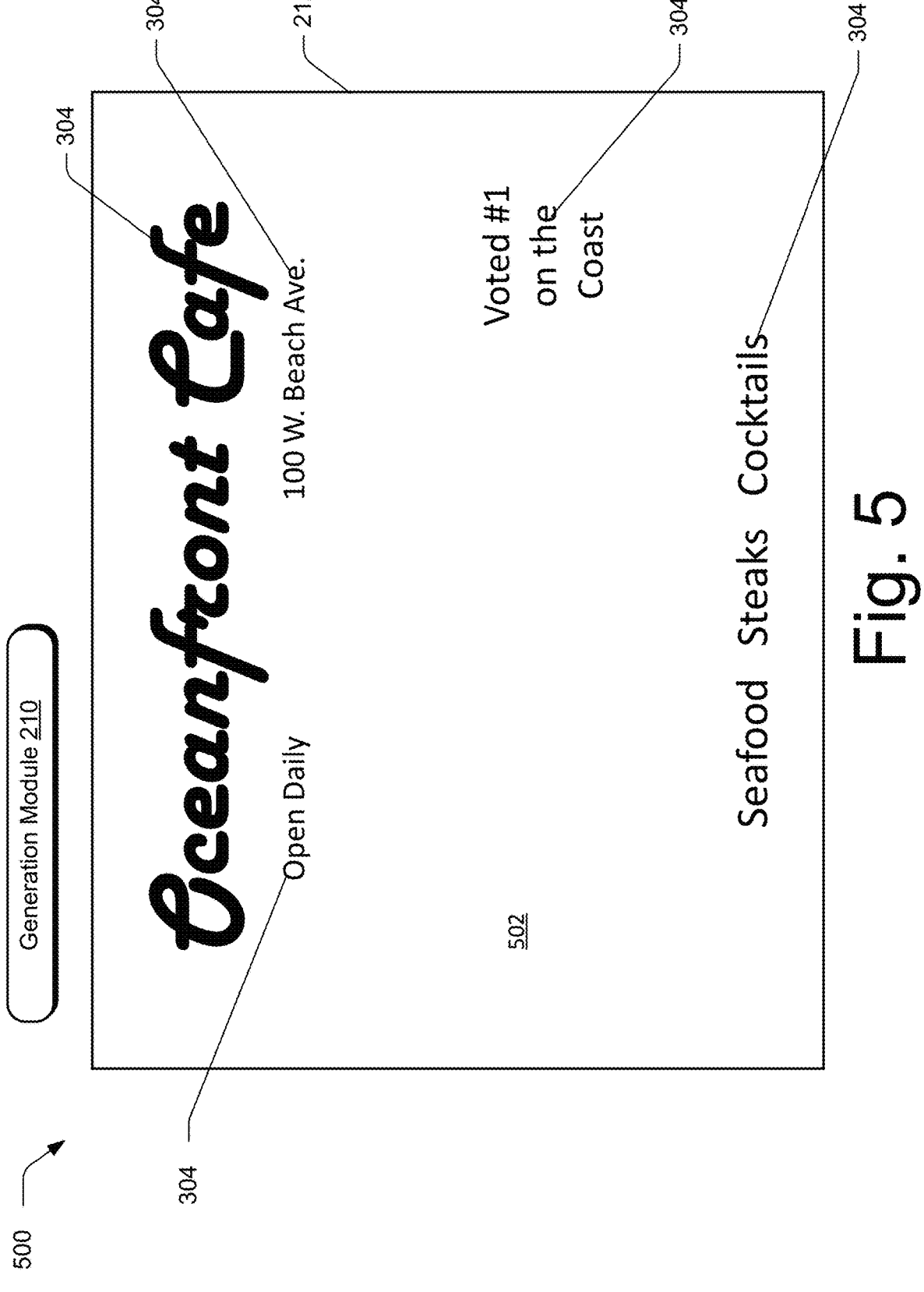
FIG. 5 depicts an example of generating a text channel image by isolating the text layer from the plurality of layers.

FIG. 5 depicts an example 500 of generating a text channel image 212 by isolating the text layer 202 from the plurality of layers 122. FIG. 5 is a continuation of the example described in FIG. 4. As discussed earlier with respect to FIG. 4, the identification module 208 identifies a text layer 202 in the item of digital content 120 from the plurality of layers 122.

Returning to FIG. 5, the generation module 210 generates a text channel image 212 by isolating the text layer 202 from the plurality of layers 122 and converting the text layer 202 into image format. The text channel image 212 includes, solely, the text layer 202 from the plurality of layers 122, as discussed earlier with respect to FIG. 4. As such, the text layer 202 includes text elements 304. In this example, the text layer features text elements 304 including "Oceanfront Cafe," "Open Daily," "100 W. Beach Ave.," "Voted #1 on the Coast," and "Seafood Steaks Cocktails." The text channel image 212 displays the text elements 304 on a white background 502. The white background 502 replaces the image layer 204 and vector layer 206 over which the text elements 304 of the text layer 202 overlapped in the original item of digital content 120. This simplifies the representation of the information from the PDF by replacing an image background with a white background.

In some examples, one or multiple text elements 304 in the text layer 202 are displayed in non-black text. In order for the text elements 304 in the text layer 202 to display clearly on a white background, non-black text is changed to black text in an example implementation. For example, the text reading "Seafood Steaks Cocktails" is displayed in white text in the layered PDF 302, as shown in FIG. 3. The white text is clearly displayed when layered over an image layer 204 that is dark. In order for the text to be visible on a white background, the text is changed from white to black. This results in black text sharply displayed on a white background.

In some examples, changing non-black text to black text includes identifying non-black text in the text layer 202 before altering a color of the non-black text to present the black text.

In other examples, a substitute text layer (not shown) is created by generating a copy of the text layer 202 and changing non-black text in the substitute text layer to black text while keeping the text layer 202 in its original state.

In some examples, the text channel image 212 maintains a text layout of the text layer 202 in the original PDF or item of digital content 120. The text elements 304 in the text channel image 212 appear identical in position and size to the text elements 304 in the text layer 202.

Figure 6:
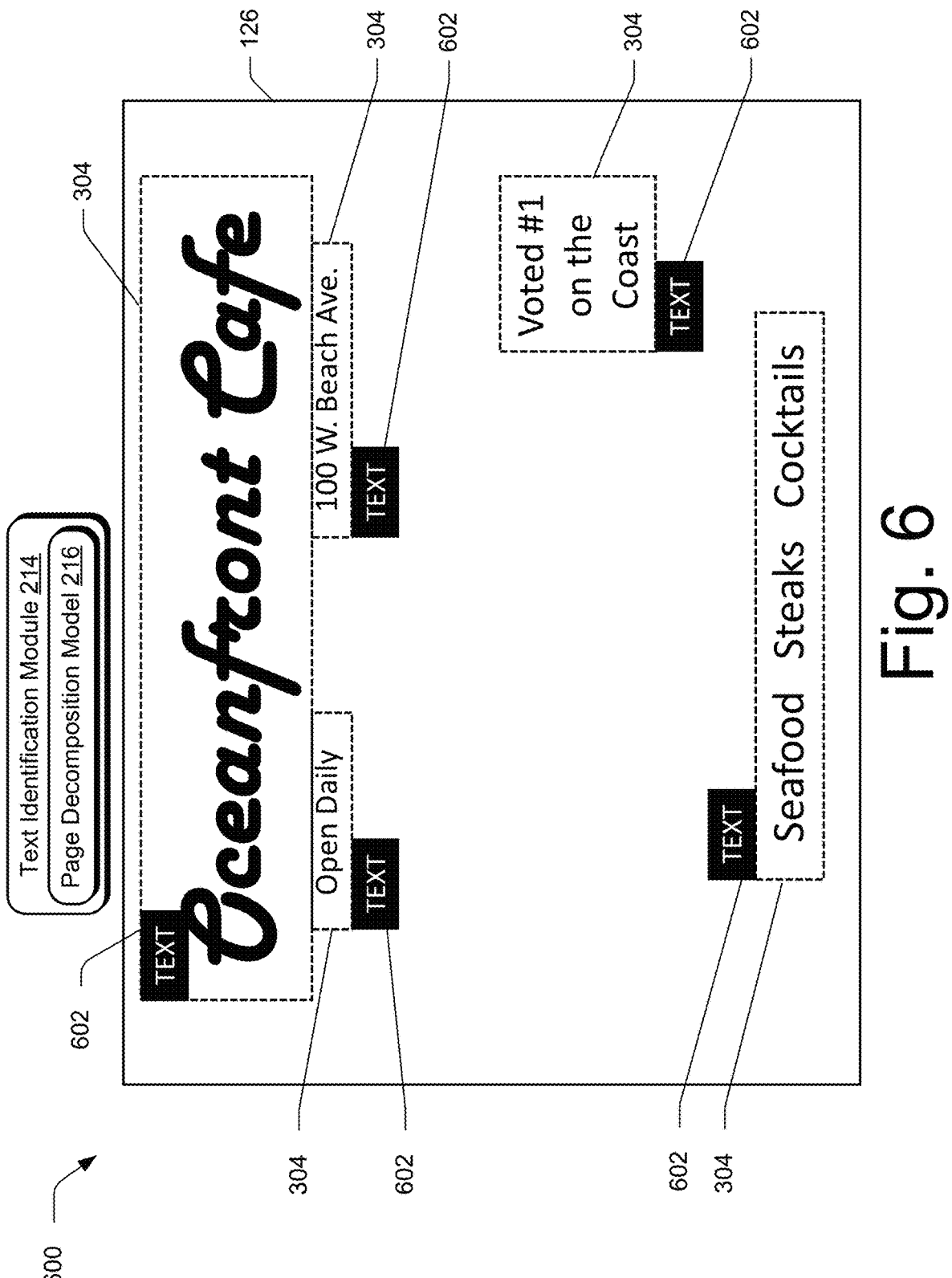
FIG. 6 depicts an example of generating a text identification based on the text channel image using a page decomposition model.

FIG. 6 depicts an example 600 of generating a text identification 126 based on the text channel image 212 using a page decomposition model. FIG. 6 is a continuation of the example described in FIG. 5. As discussed earlier with respect to FIG. 5, a text channel image 212 is generated by isolating the text layer 202 from the plurality of layers 122.

Returning to FIG. 6, the text identification module 214 generates a text identification 126 based on the text channel image 212 using a page decomposition model 216, which is trained using machine learning.

The page decomposition model 216 has seven input channels, including image of the page, image of the previous page, image of the next page, image of text content on the page, image of raster/figure content on the page, image of vector content on the page, and font attributes of text on the page. For example, the image of text content on the page is input into the page decomposition model 216.

The page decomposition model 216 is configurable as a vision based deep neural network object detector that receives an image of a PDF and decomposes the PDF into six classes, including text, heading, list, table, figure, and footnote. Each of the six classes is a text identification 126. In this way, the page decomposition model 216 generates a text identification 126 by dividing the text channel image 212 into regions and identifying text in the regions. In this example, the text identification 126 includes a bounding box identifying text in the text channel image 212 with the addition of a label 602 identifying what type or class of text is present in the text channel image 212.

Here, the page decomposition model 216 identifies five instances of a text identification 126 for the class "text" in the text channel image 212. These instances of the class "text" are text elements 304 "Oceanfront Cafe," "Open Daily," "100 W. Beach Ave.," "Voted #1 on the Coast," and "Seafood Steaks Cocktails." In this example, the text identification module 214 generates a label 602 assigned each instance of the class text with the label 602 "TEXT" based on the text identification 126. In this example, the text identification module 214 also generates a bounding box surrounding each instance of the class text.

In other examples, the text identification module 214 identifies other classes in the text channel image 212, including text, heading, list, table, figure, and footnote and labels them "TEXT," "HEADING," "LIST," "TABLE," "FIGURE," and "FOOTNOTE," respectively. Each class of text belongs to a single logical group.

In other examples, the text identification module 214 also groups together text chunks into logical groups. For example, multiple chunks of text or lines of text belonging to the same paragraph or list is categorized in a single instance.

Figure 7:
FIG. 7 depicts an example of generating a page text identification based on the plurality of layers using a page decomposition model.

FIG. 7 depicts an example 700 of generating a page text identification 128 based on the plurality of layers 122 using a page decomposition model.

The page text identification module 218 generates a page text identification 128 based on the plurality of layers 122 using a page decomposition model 216, which is trained using machine learning. The page text identification 128 identifies instances of text in the plurality of layers 122 in the entire item of digital content 120, including instances of text in the text layer 202, the image layer 204, and the vector layer 206.

The page decomposition model 216 has seven input channels, including image of the page, image of the previous page, image of the next page, image of text content on the page, image of raster/figure content on the page, image of vector content on the page, and font attributes of text on the page.

The page decomposition model 216 is configurable as a vision based deep neural network object detector that receives an image of a PDF and decomposes the PDF into six classes, including text, heading, list, table, figure, and footnote. Each of the six classes is page text identification 128. In this way, the page decomposition model 216 generates a page text identification 128 by dividing the item of digital content 120 into regions and identifying text in the regions. In this example, the page text identification 128 is the item of digital content 120 with the addition of a page text identification label 702 identifying what type or class of text is present in the item of digital content 120 and a bounding box 704 identifying the location of text.

Here, the page decomposition model 216 applied to the plurality of layers 122 of the item of digital content 120 identifies three of the five instances of a page text identification 128 for the class "text" in the plurality of layers 122. These instances of the class "text" are "Open Daily," "100 W. Beach Ave.," and "Seafood Steaks Cocktails." In this example, the page text identification module 218 successfully identifies fewer instances of text in the plurality of layers 122 than the text identification module 214 identified in the plurality of layers 122.

In this example, the page decomposition model 216 generates a page text identification label 702 "TEXT" assigned each instance of the class text based on the page text identification 128. In this example, the page decomposition model 216 also generates a bounding box 704 surrounding each instance of the class text.

In other examples, the page text identification module 218 identifies other classes in the plurality of layers 122 of the item of digital content 120, including text, heading, list, table, figure, and footnote and labels them "TEXT," "HEADING," "LIST," "TABLE," "FIGURE," and "FOOTNOTE," respectively. Each class of text belongs to a single logical group.

In other examples, the page text identification module 218 also groups together text chunks into logical groups. For example, multiple chunks of text or lines of text belonging to the same paragraph or list is categorized in a single instance.

Figure 8:
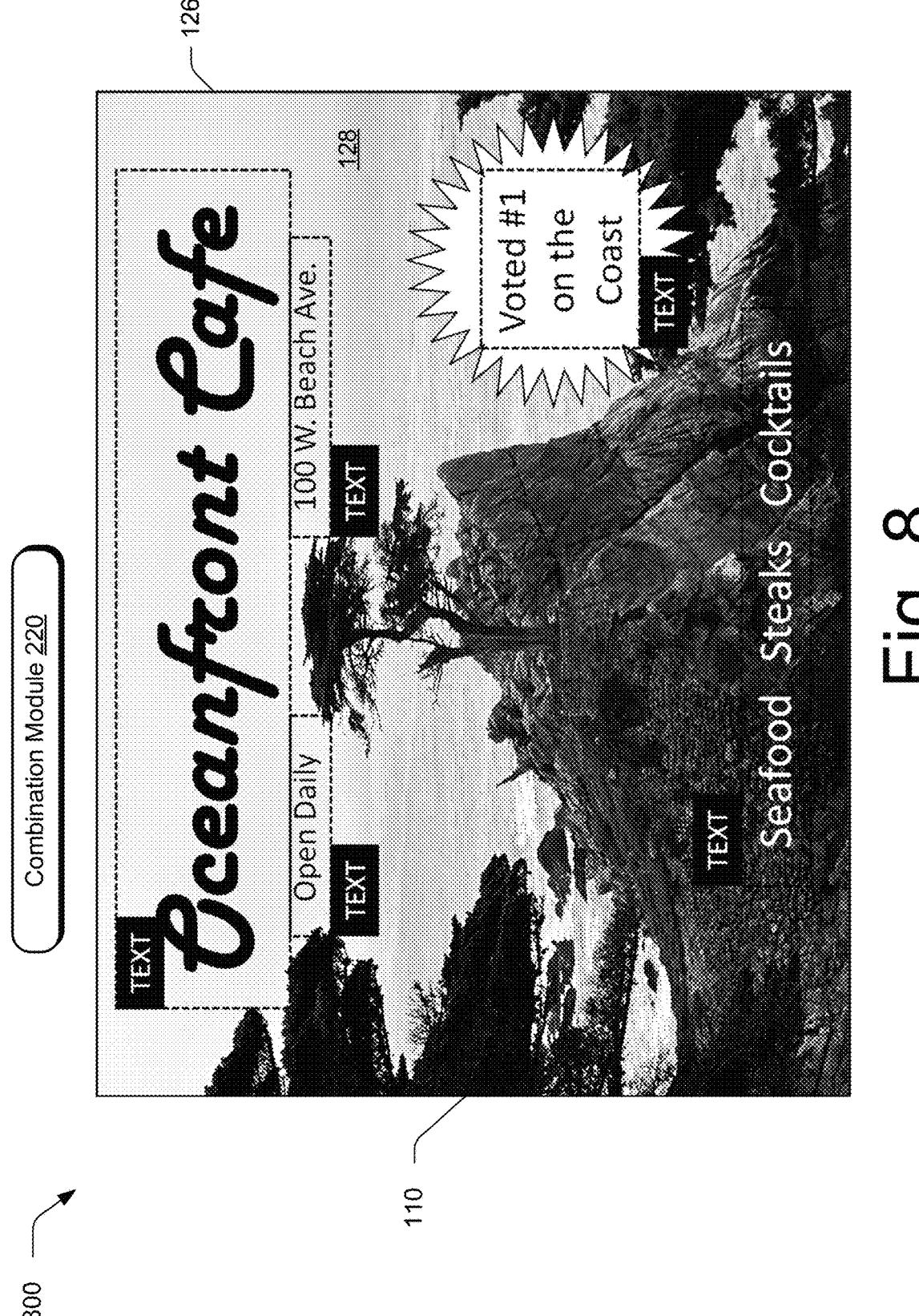
FIG. 8 depicts an example of combining the text identification with the page text identification.

FIG. 8 depicts an example 800 of combining the text identification 126 with the page text identification 128. FIG. 7 is a continuation of the example described in FIG. 6 and FIG. 7. As discussed earlier with respect to FIG. 6 and FIG. 7, the text identification module 214 generates a text identification 126 based on the text channel image 212 using a page decomposition model 216 and the page text identification module 218 generates a page text identification 128 based on the plurality of layers 122 using the page decomposition model 216.

Returning to FIG. 8, the combination module 220 receives the text identification 126 and the page text identification 128. The combination module 220 then combines the text identification 126 with the page text identification 128 for display in a user interface 110. This provides an identification of all classes of text in the item of digital content 120.

The combination module 220 uses an IoU (Intersection over Union) model to identify overlapping bounding box instances in the text identification 126 and the page text identification 128. Based on this, the combination module 220 removes duplicate text identifications. This generates a text identification 126 free from redundancies.

In other examples, objects are identified in the plurality of layers 122. This forms an object identification (not shown). After the page text identification 128 and object identification are generated, the page text identification 128 and object identification are combined.

In some examples, after the text identification 126 is combined with the page text identification 128, the combination module 220 changes the text of the text identification 126 from black text to non-black text. This includes returning the text to its original non-black color from the PDF.

In this way, the techniques for text identification in layered digital content are able to overcome the limitations of conventional techniques, allowing a user to view a text identification 126 presented visually as text labels overlapping the original PDF.

Example Procedures

The following discussion describes techniques which are implementable utilizing the previously described systems and devices. Aspects of each of the procedures are implementable in hardware, firmware, software, or a combination thereof. The procedures are shown as a set of blocks that specify operations performed by one or more devices and are not necessarily limited to the orders shown for performing the operations by the respective blocks. In portions of the following discussion, reference is made to FIGS. 1-9.

FIG. 9 depicts a procedure 900 in an example implementation of text identification in layered digital content. At block 802, an item of digital content 120 including a plurality of layers 122 is received. In some examples, the plurality of layers 122 includes an image layer 204. Additionally or alternatively, the plurality of layers 122 includes a vector layer 206.

At block 904, a text layer 202 in the item of digital content 120 is identified from the plurality of layers 122.

At block 906, a text channel image 212 is generated by isolating the text layer 202 from the plurality of layers 122. In some examples, generating the text channel image 212 includes changing non-black text to black text. For instance, changing the non-black text to the black text further includes identifying the non-black text in a text layer 202 and altering a color of the non-black text to present the black text. Additionally or alternatively, generating the text channel image 212 includes maintaining a text layout of the text layer 202 from the item of digital content 120.

At block 908, a text identification 126 is generated based on the text channel image 212 using a page decomposition model 216, the page decomposition model 216 trained using machine learning. In some examples, the page decomposition model 216 uses a deep neural network trained to divide the text channel image 212 into regions to identify classes of text. Additionally or alternatively, the text identification 126 is combined with a page text identification 128 that identifies text based on the plurality of layers 122. Some examples further include changing the black text to the non-black text after the text identification 126 is generated.

FIG. 10 depicts a procedure 1000 in an additional example implementation of text identification in layered digital content. At block 902, an item of digital content 120 including a text layer 202 and an image layer 204 is received by a processing device.

At block 1004, the text layer 202 in the item of digital content 120 is identified by the processing device.

At block 1006, a text channel image 212 is generated by the processing device by separating the text layer 202 from the image layer 204. In some examples, the text channel image 212 includes text on a white background. In some examples, the text channel image 212 includes changing non-black text to black text. For instance, changing the non-black text to the black text further includes identifying the non-black text in a text layer and altering a color of the non-black text to present the black text. In some examples, a text layout of the text layer 202 is maintained from the item of digital content 120.

At block 1008, a text identification 126 based on the text channel image 212 is generated by the processing device using a page decomposition model 216, the page decomposition model 216 trained using machine learning. In some examples, the page decomposition model 216 uses a deep neural network trained to divide the text channel image 212 into regions to identify classes of text. Some examples further include changing the black text to the non-black text after the text identification 126 is generated.

At block 1010, a page text identification 128 is generated by the processing device that identifies text based on the text layer 202 and the image layer 204 using the page decomposition model 216.

At block 1012, the text identification 126 is combined with the page text identification 128 for display in a user interface 110 by the processing device.

Example System and Device

Figure 11:
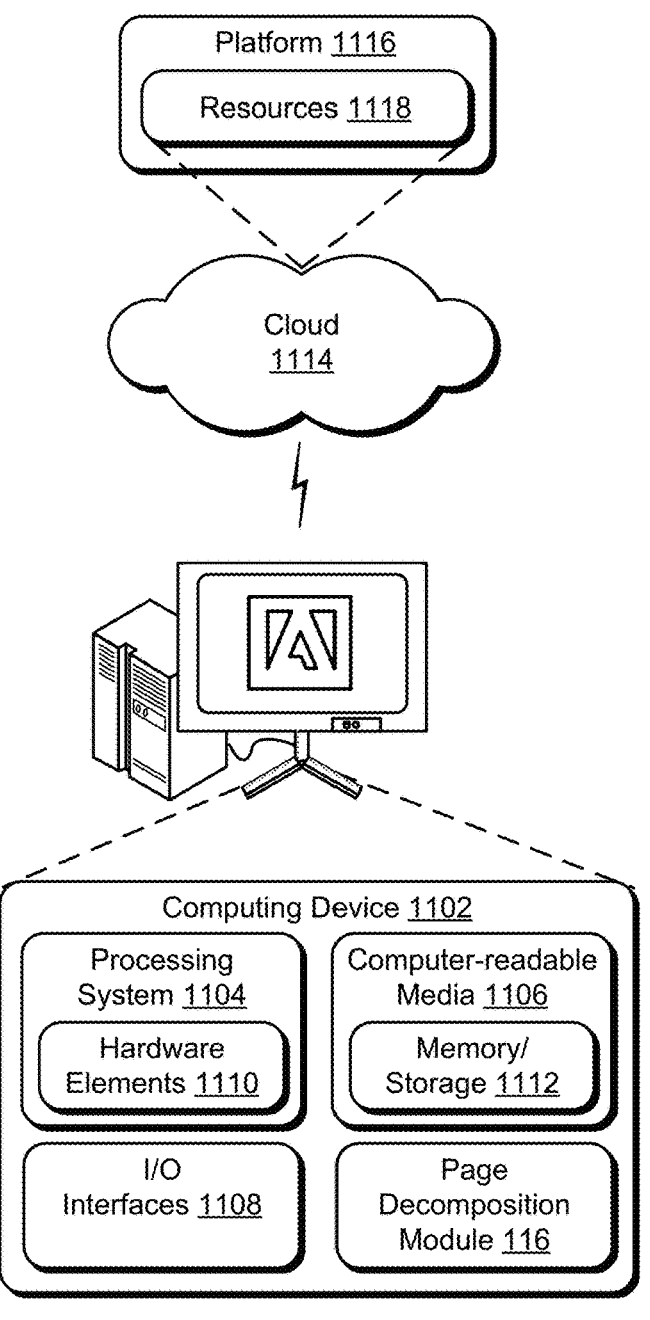
FIG. 11 illustrates an example system including various components of an example device that can be implemented as any type of computing device as described and/or utilize with reference to FIGS. 1-10 to implement embodiments of the techniques described herein.

FIG. 11 illustrates an example system generally at 1100 that includes an example computing device 1102 that is representative of one or more computing systems and/or devices that implement the various techniques described herein. This is illustrated through inclusion of the page decomposition module 116. The computing device 1102 is configurable, for example, as a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware.

Accordingly, the processing system 1104 is illustrated as including hardware element 1110 that is configurable as processors, functional blocks, and so forth. This includes implementation in hardware as an application specific integrated circuit or other logic device formed using one or more semiconductors. The hardware elements 1110 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 1106 is illustrated as including memory/storage 1112. The memory/storage 1112 represents memory/storage capacity associated with one or more computer-readable media. The memory/storage 1112 includes volatile media (such as random access memory (RAM)) and/or nonvolatile media (such as read only memory (ROM), Flash memory, optical disks, magnetic disks, and so forth). The memory/storage 1112 includes fixed media (e.g., RAM, ROM, a fixed hard drive, and so on) as well as removable media (e.g., Flash memory, a removable hard drive, an optical disc, and so forth). The computer-readable media 1106 is configurable in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 1102. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 1102, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 1110. The computing device 1102 is configured to implement particular instructions and/or functions corresponding to the software and/or hardware modules. Accordingly, implementation of a module that is executable by the computing device 1102 as software is achieved at least partially in hardware, e.g., through use of computer-readable storage media and/or hardware elements 1110 of the processing system 1104. The instructions and/or functions are executable/operable by one or more articles of manufacture (for example, one or more computing devices and/or processing systems 1104) to implement techniques, modules, and examples described herein.

The techniques described herein are supported by various configurations of the computing device 1102 and are not limited to the specific examples of the techniques described herein. This functionality is also implementable through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 abstracts resources and functions to connect the computing device 1102 with other computing devices. The platform 1116 also serves to abstract scaling of resources to provide a corresponding level of scale to encountered demand for the resources 1118 that are implemented via the platform 1116. Accordingly, in an interconnected device embodiment, implementation of functionality described herein is distributable throughout the system 1100. For example, the functionality is implementable in part on the computing device 1102 as well as via the platform 1116 that abstracts the functionality of the cloud 1114.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving, by a processing device, an item of digital content including a plurality of layers;
   identifying, by the processing device, a text layer in the item of digital content from the plurality of layers;
   generating, by the processing device, a text channel image by isolating the text layer from an image layer of the plurality of layers;
   identifying, by the processing device, a text element in the text channel image and an additional text element in the image layer of the plurality of layers using a machine learning model, the text element in the text channel image overlapping the image layer;
   identifying, by the processing device, one or more types of text corresponding to the text element and the additional text element; and
   generating, by the processing device, an annotated item of digital content that includes one or more labels identifying the one or more types of the text by combining the text element and the additional text element and eliminating duplicate identified text from the text element and the additional text element.

2. The method of claim 1, wherein generating the text channel image includes changing non-black text to black text.

3. The method of claim 2, wherein changing the non-black text to the black text further includes identifying the non-black text in the text layer and altering a color of the non-black text to present the black text.

4. The method of claim 2, further comprising changing the black text to the non-black text after generating the annotated item of digital content.

5. The method of claim 1, wherein the image layer includes at least one image depicting text on an object.

6. The method of claim 1, wherein the image layer includes one or more vectors.

7. The method of claim 1, wherein the machine learning model uses a deep neural network trained to divide the text channel image into regions to identify classes of text.

8. The method of claim 1, wherein generating the text channel image includes maintaining a text layout of the text layer from the item of digital content.

9. A system comprising:

a memory component; and a processing device coupled to the memory component, the processing device configured to perform operations including:

receiving an item of digital content including a text layer and an image layer;

identifying the text layer in the item of digital content;

generating a text channel image by separating the text layer from the image layer;

identifying a text element in the text channel image and an additional text element in the image layer using a page decomposition model trained using machine learning, the text element in the text channel image overlapping the image layer;

identifying, by the processing device, one or more types of text corresponding to the text element and the additional text element; and generating an annotated item of digital content that includes one or more labels identifying the one or more types of the text by combining the text element and the additional text element and eliminating duplicate identified text between the text element and the additional text element.

10. The system of claim 9, wherein the text channel image includes text on a white background.

11. The system of claim 9, wherein generating the text channel image includes changing non-black text to black text.

12. The system of claim 11, wherein changing the non-black text to the black text further includes identifying the non-black text in the text layer and altering a color of the text layer to present the black text.

13. The system of claim 9, wherein the page decomposition model uses a deep neural network trained to divide the text channel image into regions to identify classes of text.

14. The system of claim 9, wherein generating the text channel image includes maintaining a text layout of the text layer from the item of digital content.

15. A non-transitory computer-readable medium storing executable instructions, which when executed by a processing device, cause the processing device to perform operations comprising:

receiving an item of digital content including a text channel and at least one image channel;

identifying the text channel;

generating a text channel image by isolating the text channel from the at least one image channel;

identifying a text element in the text channel image and an additional text element in the at least one image channel using a machine learning model, the text element in the text channel image overlapping the at least one image channel;

identifying, by the processing device, one or more types of text corresponding to the text element and the additional text element; and generating an annotated item of digital content that includes one or more labels identifying the one or more types of the text by combining the text element and the additional text element and eliminating duplicate identified text between the text element in the text channel image and the additional text element in the at least one image channel.

16. The non-transitory computer-readable medium of claim 15, wherein generating the text channel image includes changing non-black text to black text by identifying the non-black text in the text channel and altering a color of the non-black text to present the black text.

17. The non-transitory computer-readable medium of claim 15, wherein the machine learning model uses a deep neural network trained to divide the text channel image into regions to identify classes of text.

18. The method of claim 1, wherein the annotated item of digital content includes a layout of the item of digital content.

19. The non-transitory computer-readable medium of claim 15, wherein generating the text channel image includes maintaining a text layout of the text channel from the item of digital content.

20. The non-transitory computer-readable medium of claim 15, wherein the at least one image channel includes at least one image depicting text on an object.

* * * * *